Figure 11:
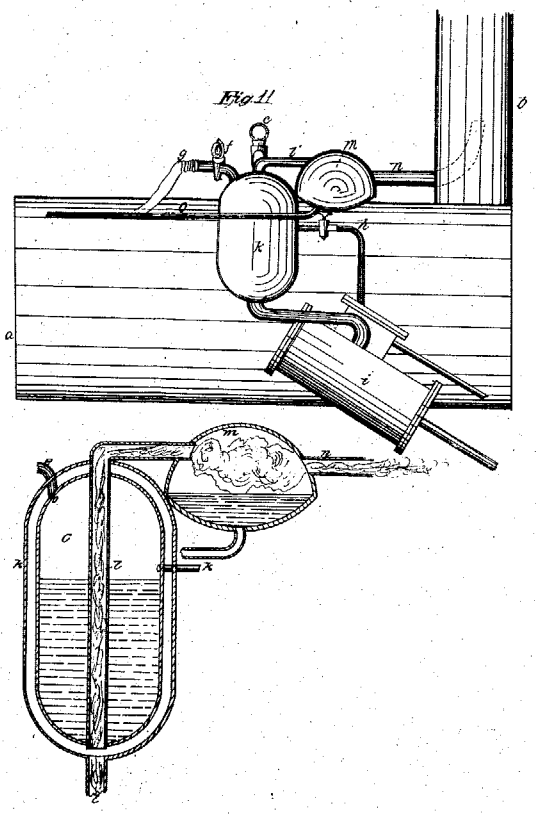
Figure 10:
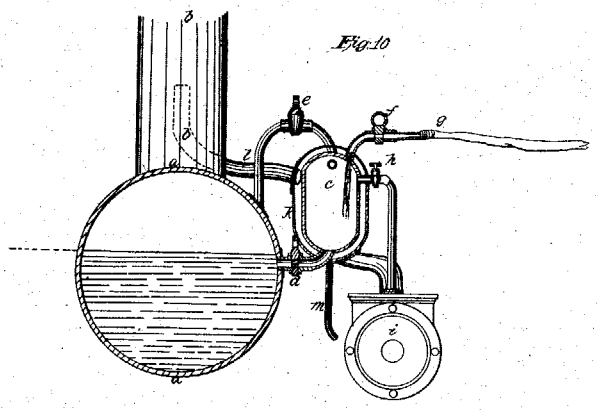

7351X
3 Sheets-Sheet 1.
S. H. Long,
Locomotive.
Patented Dec. 28, 1832.
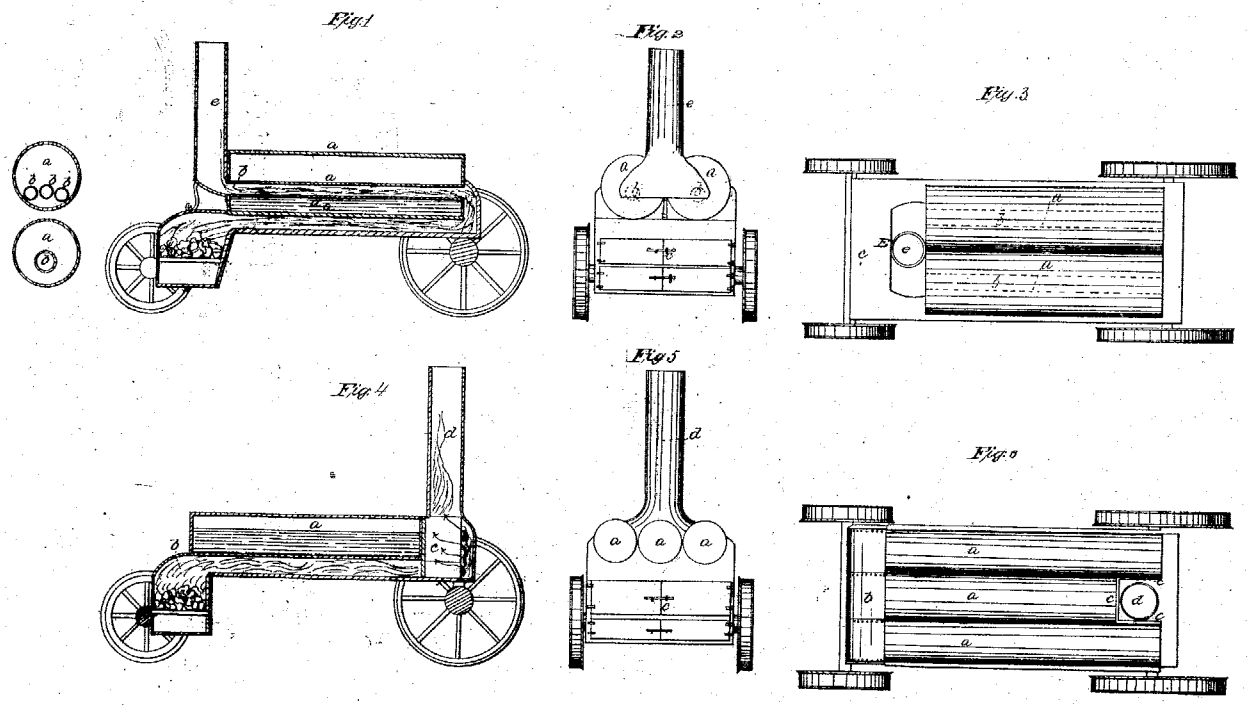

7351X
3 Sheets-Sheet 2.
S. H. Long,
Locomotive.
Patented Dec. 28, 1832.
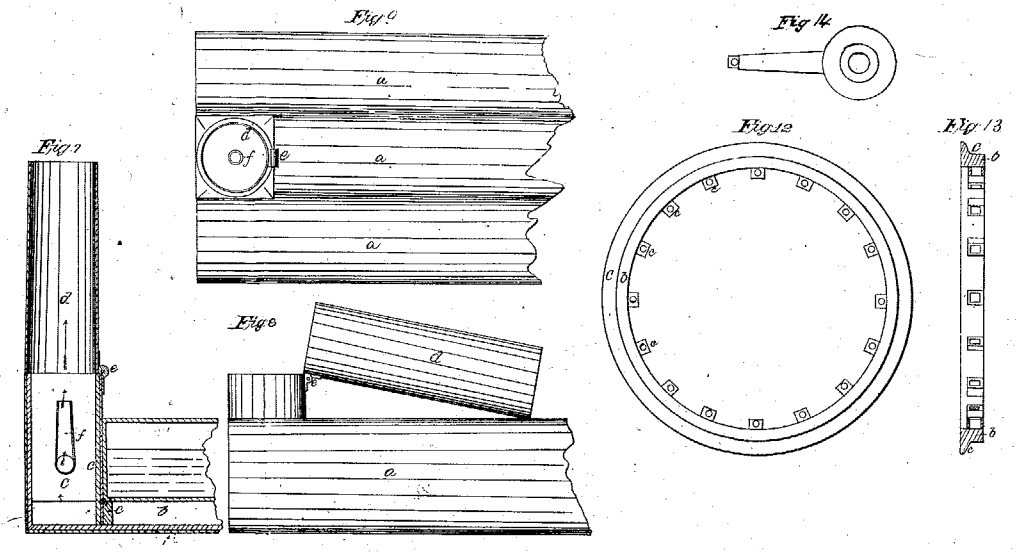

7351X

3 Sheets-Sheet 3.

S. H. Long,

Locomotive.

Patented Dec. 28, 1832.

7351X

Stephen H Long

Letters Patent

The Schedule referred to in these letters Patent, and making part of the same containing a description in the words of the said S. H. Long himself of his improvement in the Locomotive Steam Engine and other Rail Road carriages The application and use of two parallel cylindrical boilers placed horizontally on the carriage and lengthwise thereof with one or more horizontal flues, passing longitudinally through each boiler in the lower half thereof which flues must be of a size sufficient to convey the heated air, flame &c from the fire place to the chimney both of which, in this case, are situated at the same end of the boilers. The fire place is located beneath the boilers and has its sides and front formed of Sheet Iron suitably lined or lated with fire Brick or clay and in its rear sides above a bridging of brick or soap stone and opens into a broad flue of the entire width of both boilers, the sides bottom and back ends of which are constructed of sheet iron suitably braced and appropriately lined or [illegible] with fire brick or clay. the boilers themselves constitute the roof or upper side not only of this broad flue but also of the fire place. At the back end of the boilers: the broad flue communicates with the flues leading through the boilers. This mode of construction is believed to be entirely new in its application to Locomotive Steam Engines In this item I claim the application of two horizontal cylindrical boilers with two or more flues in each passing Longitudinally through them the fire Place being exterior of the boilers & beneath them. a single boiler of similar construction having been previously [illegible] employed by Oliver Evans in the construction of a locomotive Engine and by others for other purposes.

II. The application and use of three parallel cylindrical boilers placed horizontally on the carriage and lengthwise thereof with one or X without flues leading through them. the latter mode being prefer
red when the diameter of each boiler does not exceed fifteen inches.
The fire place in this case also is located at one end of the boilers
& occupies a width equal or nearly so to that of the three togeth
er — The front and sides of the fire place are formed of sheet iron
appropriately braced and stiffened and lined with fire Brick or
Clay as before — In rear of the fire place is a bridging of brick
or Soap Stone as before mentioned above which the fire place commu
nicates with a broad flue of appropriate depth & of a width equal to
that of the fire place, or to the entire width occupied by the three boilers.
The sides bottom and rear of this flue are constructed of sheet iron or
copper and appropriately lined with fire brick or clay. Its roof
is formed of the three boilers which have their entire under surface
or those portions of their entire surface situated below a horizontal
plane passing through their centres exposed to the action of the heat
generated in the fire place The middle boiler of the three is shorter by about one foot than
either of the outside boilers in order to afford a communication from the
broad flue into the Chimney which rises perpendicularly from the back
or rear end of the middle boiler & between the other two boilers.
A direct passage from the flue into the chimney is intercepted by a tile
of fire clay or slab of soap stone which compels the heated air to pass
round the extremities of the tile and immediately under the back ends
of the exterior boilers before it can enter the Chimney which rises imme
diately back of the tile — For many particulars in regard to the relative
dimensions of the grate and the best mode of constructing furnaces for
Steam Engines I am indebted to the liberality and intelligence of
James [illegible] Esquire of Philadelphia. but their application and
use in the construction of Locomotive Engines I claim for myself
as new and useful — In this Plan I claim the application
of three horizontal cylindrical boilers (with or) without flues leading
through them — The fire place being exterior of the boilers and beneath
them — Similar boilers having been previously employed by myself 7351x Dec 28, 1832 and others for other purposes. I also claim the manner of construction specified in the item — although as stated therein I am indebted to Mr [illegible] for much useful information which enabled me to regulate the dimensions of the various parts as exhibited in the Pennsylvania Locomotive.

III Another mode of constructing a switch or moveable chimney & its application to locomotive Steam Engines which is as follows Viz.
The Chimney rises in a square form through the space provided for it as stated in the preceding item of this supplement to the height of two or three feet above the upper edge of the tile or soap stone — slab before mentioned. This portion of the chimney is sufficiently large to receive a luting or lining of fire clay to protect it against the the heat and serves as a pedestal or basement for the switch or moveable part of the Chimney — which is round and is connected with the pedestal by means of a hinge or joint on which this part of the Chimney traverses in such a manner as to admit of its being laid horizontally upon the carriage or erected perpendicularly as occasion may require in passing under Bridges through tunnels &c.

Note. — The waste steam of the working cylinders is conveyed by a tube or pipe into the basement of the chimney into which it is injected perpendicularly from the tube in order to increase or accelerate the draft through the fire place flue and Chimney.

I claim in this item the application of a moveable or switch chimney differing from that described in the 4th item of my specification of June 1831. in having but a single oscillating joint instead of two tubular swivel joints as specified in that instrument

IV. 4th. An apparatus intended as a substitute for the force pump of ordinary Engines and for the purpose of supplying the boilers of locomotive & other Steam Engines with water. which apparatus I shall designate by the appellation of this free pump inasmuch as it is calculated to perform the functions of a supply pump without the aid of any external force except in so far as it may be needful in the turning of cocks — The free pump consists of a hollow cylinder capped at both ends and made steam tight to be located 7351x Dec 28, 1832 in such a position that the lowest part of its cavity shall be elevated
at least as high as the upper surface or greatest height of the water
in the boiler to which the pump is attached. The lowest part
of the pump or cylinder must communicate with the boiler at
a point or points below their water surface by means of a pipe or
tube of suitable size furnished with a stop cock or valve denomi-
nated the supply cock which may be opened or shut at pleasure.
The uppermost part of the pump or cylinder must also communi-
cate with the boiler at a point above their water surface by means
of a tube or pipe (which may be considerably smaller than the former)
furnished with a cock or valve to be called the steam cock by means
of which tube and cock steam from the boiler may be conveyed
into the pump at pleasure. The pump must also communicate
with the water cock tank or reservoir by means of a tube pipe
or hose furnished in like manner with a stop cock or valve
to be called the draft cock for the purpose of opening & shutting
this communication at pleasure. Moreover a small cock or valve
to be called the ejection cock must be applied to the pump in
some convenient position for the purpose of discharging the steam
from the pump whenever there is occasion to replenish it with
water. The steam thus discharged may be conveyed through a pipe
to the steam chest attached to the working cylinder, and instead
of being wasted may be made to contribute to the operation of
the engine — The operation of the free pump is as follows
viz. Let the supply cock and steam cock be shut. open
the ejection cock and also the draft cocks and the water will
freely flow from the reservoir (which is supposed to be higher
than the Pump) into the pump. When the Pump is
full of water or sufficiently so, shut the ejection and draft
cocks and then open the steam cock and afterwards the sup-
ply cock and the water will flow as freely from the Pump into
the boiler through the supply tube its place in the pump
being occupied by steam from the boiler. The operation may be repeated at pleasure by shutting again the cocks last mention
ed and opening the others — The principle on which this pump
operates was verbally explained to me by Charles Wetherill Esquire
of Philadelphia early in the summer of 1831. Its manner
of construction and its application to Steam Engines and espe
cially its use in locomotive Steam Engines I claim as new and
original with myself — The force pump may be surrounded
by a casing in a cylindrical form and of such size as to ad
mit a space of one inch or more between the casing and the pump
on all sides. Into this space the waste steam from the working
cylinders of the Engine may be conveyed and from which it may
also be conducted into the chimney by means of suitable tubes or
pipes communicating between these several parts. The water
in the pump may then be heated by the waste steam and better
prepared for injection into the boilers. while the water formed in
the casing from the condensation of steam may readily be con
veyed to the reservoir in the manner hereinafter explained.
In this item I claim as new and original not only the inven:
tion of the force pump as described in this item. but also its appli:
cation and use in Steam Engines generally and in connection with
steam generators as a means of supplying them with water,
especially its application to locomotive Steam Engines.

V. 5th In order to dispense with the bell cranks and other
appendages necessary to their use. I have substituted a compound
axle in three parts with cranks and other appropriate fixtures
in connection with the working wheels of the locomotive. This
arrangement is effected in part by adopting in pairs, wheels
of different diameters and by providing suitable bearings
for the support of the carriage bed, boilers, cylinders &c both
exteriorly and interiorly of the wheels, the working wheels
being about 4 1/2 feet and the others about 3 feet in diame
ter with rims respectively adjusted to a road with curvature
on a radius of 400 feet. The arrangement here alluded to together with the leading improvements contemplated in this spe-
cification are mostly to be exemplified in the model deposited in
the Patent Office —

VI. 6th. A method of heating the water within the force Pump
by means of the waste Steam and of preserving for use the water thus
condensed from said Steam by intercepting its discharge on its
passage from the force Pump into the Chimney or atmosphere This method consists in the injection of the waste Steam
first into the casing by which the pump is surrounded - then vertical
ly into a sort of dome attached to the upper part or side of the
casing into which dome the steam enters through a tube rising
from the lower part of the concavity of the casing passing vertical-
ly through the force pump and penetrating nearly to the top of
the dome and then either into the chimney or open air through
a tube passing out of the dome at a point about midway between
its top and bottom - The water that may have been formed by
condensation and collected in the lower part of the casing will thus
be carried upward by the steam through the vertical tube leading through
the pump and be deposited in the dome. whence it will be conveyed
through a tube leading from the bottom of the dome and thrown
into the reservoir for future use VII. 7th. Another method of constructing wheels for locomotive En-
gines and other rail way Carriages differing from that described in the
first item of my specification of June 1831. in the following partic-
ulars viz — The rim together with its flanges is cast sepa-
rately from the hub and spokes and is furnished with [illegible]
adapted to the reception of the outward extremities of the spokes into
which the latter are inserted and held fast by means of [illegible]
or clamps embracing the ends of the spokes and confining them to
the interior flange of the rim - The spokes have a taper [illegible]
[illegible] as they recede from the hub. In all other respects
the spokes and hub may be similar to those of the wheel described
in my specification of June 1831. before alluded to — This mode 7351x Dec 28, 1832 239 of constructing Wheels for Rail Road Cars is believed to be entire-
ly new and will be exemplified in the model intended as an illus-
tration of these my improvements.
Among the benefits resulting from this improvement are the following
namely— The respective parts above considered may be made of such iron
as is best calculated to facilitate the construction of the wheel without
impairing its strength or durability. for example the rim may be made
of fine hard metal while the spokes & hub which require much dress-
ing in order to their proper adjustment may be made of iron much soft-
er and more susceptible of being wrought with ease and despatch.
The rim may be case hardened or cast in a chill without producing
an injurious strain upon this or any other parts of the wheel thereby
impairing its efficient strength — When the rim shall have been
worn out the wheel may be effectually renovated by substituting a new
rim in connection with the old spokes and hub which from the na-
ture of the service they have to perform are far less exposed to wear
than the rim By this means the renewing of the Wheels of Rail
Road Carriages may be effected at a comparatively moderate expense.
VIII. 8th. The successful application and use of Anthracite
Coal as fuel for the generation of Steam for the propulsion of Locomotive
Engines and their trains of loaded cars continuously for more
than one hour at a speed of ten or more miles per Hour the weight
of the entire train and load being equivalent to five times the
weight of the Engine and the rail road being level or at a less speed
the weight of the load being proportionably increased Witnesses,
N. G. Brown
John Bimes S. H. Long E.
Ch.